United States Patent
Cha et al.

(10) Patent No.: US 7,443,390 B2
(45) Date of Patent: Oct. 28, 2008

(54) POWER SUPPLY DEVICE OF VIDEO DISPLAY APPARATUS AND METHOD THEREOF

(75) Inventors: Young Chuel Cha, Daegu (KR); Jong Jin Woo, Daegu (KR)

(73) Assignee: LG Electronics Inc., Seoul (KR)

( * ) Notice: Subject to any disclaimer, the term of this patent is extended or adjusted under 35 U.S.C. 154(b) by 517 days.

(21) Appl. No.: 11/174,588

(22) Filed: Jul. 6, 2005

(65) Prior Publication Data

US 2005/0243081 A1 Nov. 3, 2005

Related U.S. Application Data

(63) Continuation of application No. 10/437,243, filed on May 14, 2003, now Pat. No. 7,126,647.

(30) Foreign Application Priority Data

May 16, 2002 (KR) .................. 2002-26992

(51) Int. Cl.
 *G09G 5/00* (2006.01)
(52) U.S. Cl. ............... 345/211; 345/212; 348/730
(58) Field of Classification Search ............ 345/94–95, 345/211–212, 60, 76, 87, 204; 307/24, 31, 307/126, 140; 326/267; 348/730
See application file for complete search history.

(56) References Cited

U.S. PATENT DOCUMENTS

| | | | |
|---|---|---|---|
| 5,477,729 A | 12/1995 | Cavalloni | 73/587 |
| 5,771,164 A | 6/1998 | Murai et al. | 363/89 |
| 6,272,030 B1 | 8/2001 | Oomura | 363/62 |
| 6,362,980 B1 | 3/2002 | Ohashi et al. | 363/21.01 |
| 6,469,479 B2 * | 10/2002 | Kim | 323/267 |
| 6,661,680 B2 | 12/2003 | Maruoka | 363/48 |
| 7,126,647 B2 * | 10/2006 | Cha et al. | 348/730 |
| 7,170,761 B2 * | 1/2007 | Yasumura | 363/17 |
| 2005/0243081 A1 | 11/2005 | Cha et al. | 345/12 |

* cited by examiner

*Primary Examiner*—Richard Hjerpe
*Assistant Examiner*—Mansour M Said
(74) *Attorney, Agent, or Firm*—Ked & Associates, LLP

(57) ABSTRACT

A power supply device of a video display apparatus and a method thereof is capable of improving operation reliability of a video display apparatus, preventing erratic operation of the video display apparatus caused by higher harmonics and preventing erratic operation of other apparatus caused by unnecessary transmitted radiative wave. The power supply device can include a rectifying section for converting AC power into DC power, a harmonics suppressor for cutting off higher harmonics included in the DC power and a smoothing circuit for smoothing the higher harmonics cut-off DC power. A standby power supplier is for supplying the smoothed DC power to the video display apparatus as standby power, a main power supplier is for supplying the smoothed DC power to the video display apparatus as main power and a control unit is for controlling an operation of the harmonics suppressor.

25 Claims, 4 Drawing Sheets

POWER SUPPLY DEVICE OF VIDEO DISPLAY APPARATUS AND METHOD THEREOF

This application is a Continuation of U.S. patent application Ser. No. 10/437,243, filed May 14, 2003, now U.S. Pat. No. 7,126,647 and claims priority to Korean Patent Application No. 26992/2002, filed May 16, 2002. The entire disclosure of the prior applications are considered as being part of the disclosure of the accompanying application and is hereby incorporated by reference therein.

BACKGROUND OF THE INVENTION

1. Field of the Invention

The present invention relates to a video display apparatus, and in particular to a power supply device of a video display apparatus and a method thereof.

2. Background of the Related Art

In general, it is very important to supply stable power to a video display apparatus. Further, it is required to restrain generation of unnecessary radiative wave (in particular, higher harmonics) caused by noise or internal/external causes and prevent higher harmonics from being transmitted to other parts or other apparatus through a power line or an additional common line to guarantee operation reliability of the video display device.

For example, because higher harmonics are related to EMI (electromagnetic interference), when higher harmonics reach a video display apparatus, they can cause fatal damage to the operation of the video display apparatus. In particular, when higher harmonics generated in the power supply device are supplied to the video display apparatus, they can have a bad influence upon operation reliability or stability of the video display apparatus. In addition, because higher harmonics can be easily transmitted to other apparatus through a power line connected with the video display apparatus, higher harmonics in the power supply device have to be prevented.

FIG. 1 is a block diagram illustrating a power supply device of a video display apparatus in accordance with the related art. As shown in FIG. 1, the power supply device of the video display apparatus includes an AC power input block 101, a filtering unit 102 for removing EMI (electromagnetic interference) from AC power received through the AC power input block 101 and a rectifying section 103 for converting AC power outputted through the filtering unit 102 into DC power. A standby smoothing circuit 104 and a standby power supplier 105 supply DC power outputted from the rectifying section 103 to the video display apparatus as standby power. A harmonics suppressor 106 is for cutting off higher harmonics included in DC power (e.g., DC power including ripple element) outputted from the rectifying section 103. A main power smoothing circuit 107 and a main power supplier 108 provide DC power outputted from the harmonics suppressor 106 to the video display device as main power.

The operation of the power supply device of the video display apparatus in accordance with the related art will be described with reference to FIG. 2. FIG. 2 is a graph showing ripple waveforms (i.e., voltage waveform 201, current waveform 202) of a voltage and current inputted to the standby power supplier 105 installed at the power supply device of the video display apparatus in accordance with the related art.

First, the filtering unit 102 removes EMI by removing noise element included in the AC power applied from the AC input block 101 and outputs the noise-removed AC power to the rectifying section 103. The rectifying section 103 converts the noise-removed AC power into DC power and respectively supplies the converted DC power to the standby power smoothing circuit 104 and the harmonics suppressor 106. The rectifying section 103 can include one rectifier for the standby power and another rectifier for the main power. The DC power outputted through the rectifying section 103 includes ripple element.

The standby power smoothing circuit 104 smoothes the DC power including the ripple element and outputs the smoothed DC power to the standby power supplier 105, and the standby power supplier 105 stabilizes the smoothed DC power to supply the stabilized DC power to the video display apparatus as standby power. The standby power supplier 105 supplies the DC power including the higher harmonics to the video display apparatus.

In the meantime, the harmonics suppressor 106 cuts off the higher harmonics of the DC power including the ripple element outputted from the rectifying section 103 and outputs the higher harmonics-cut off DC power to the main power smoothing circuit 107. The main power smoothing circuit 107 smoothes the higher harmonics-cut off DC power and supplies the smoothed DC power to the main power supplier 108. Herein, the main power supplier 108 stabilizes the smoothed DC power and supplies the stabilized DC power as main power of the video display apparatus.

When the power supply device of the related art video display apparatus is in a standby power supply mode, since there is no means for cutting off the higher harmonics applied to the standby power supplier 105, the higher harmonics generated by a rush current is supplied to the standby power supplier 105. In more detail, only higher harmonics included in the power supplied to the main power supplier 108 are removed. Higher harmonics included in the power supplied to the standby power supplier 105 are not removed by the current waveform (e.g., rush current) 202 as depicted in FIG. 2. Accordingly, the video display apparatus may perform erratic operation because the DC power including the higher harmonics generated by the rush current is supplied to the standby power supplier 105.

In addition, the higher harmonics applied to the standby power supplier 105 may be transmitted to other apparatus through the standby power supplier 105 and a power line (not shown) and cause erratic operation of the other apparatus. For example, since the higher harmonics of the standby power has a bad influence upon the main power supplier 108, the video display apparatus may perform erratic operation.

As described above, the related art power supply device of the video display apparatus has various disadvantages. The related art power supply may cause erratic operations by applying the higher harmonics to the standby power supplier. In addition, in the related art power supply device of the video display apparatus, because the higher harmonics may be transmitted to other apparatus connected to the AC power line through the AC power input block, other apparatus may perform erratic operation.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention to provide a power supply device of a video display apparatus and a method thereof capable of improving operation reliability of a video display apparatus by supplying higher harmonics-cut off DC power to the video display apparatus as standby power and main power.

Another object of the present invention to provide a power supply device of a video display apparatus and a method thereof capable of reducing or preventing erratic operation of a video display apparatus caused by higher harmonics by supplying higher harmonics-cut off DC power to the video display apparatus as standby power and main power.

Another object of the present invention to provide a power supply device of a video display apparatus and a method thereof capable of reducing or preventing erratic operation of other apparatus caused by unnecessary radiative wave transmitted thereto by supplying higher harmonics-cut off DC power to the video display apparatus as standby power and main power.

In order to achieve at least the above-described objects in a whole or in part, there is provided a power supply device of a video display apparatus that includes a rectifier configured to convert input power, a harmonics suppressor coupled to the rectifier, a smoothing circuit coupled to the harmonics suppressor and configured to smooth power output by the harmonics suppressor, a power supplier connected to the smoothing circuit and configured to supply the smoothed power to the video display apparatus and a controller configured to control an operation of the harmonics suppressor.

To further achieve at least the above-described objects in whole or in part, there is provided a power supply device of a video display apparatus that includes a rectifier configured to rectify input power, a harmonics suppressor configured to shut off higher harmonics of the rectified power, a smoothing circuit configured to smooth the power output by the harmonics suppressor, a power supplier configured to supply the smoothed power to the video display apparatus as a first power in a first power supply mode or a second power in a second power supply mode and a controller configured to control the harmonics suppressor to operate both in the first power supply mode to supply the first power or the second power supply mode to supply the second power.

To further achieve at least the above-described objects in a whole or in part, there is provided a power supply device of a video display apparatus that includes a rectifier configured to rectify input power, a smoothing circuit configured to smooth the power output by the rectifier, a standby power supplier to supply the smoothed power to the video display apparatus as standby power, a main power supplier to supply the smoothed power to the video display apparatus as main power and a controller configured to control both in a standby power supply mode to supply the standby power or a main power supply mode to supply the main power.

To further achieve at least the above-described objects in a whole or in part, there is provided a power supply method of a video display apparatus that includes rectifying input power, removing higher harmonics included in the rectified power in each of a first power supply mode for supplying power to a video display apparatus and a second power supply mode for supplying power to the video display apparatus, smoothing the higher harmonics removed rectified power, controlling supply of the smoothed higher harmonics rectified power to the video display apparatus as first power or second power.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Preferred embodiments of a power supply device of a video display apparatus and a method thereof in accordance with the present invention are capable of improving operation reliability of a video display apparatus, reducing or preventing erratic operation of the video display apparatus caused by higher harmonics and reducing or preventing erratic operation of other apparatus caused by transmitted unnecessary radiative wave. Preferred embodiments of a power supply device of a video display apparatus and methods thereof can convert AC power into DC power and cut off or reduce higher harmonics included in the DC power in a standby power supply mode for supplying standby power to a video display apparatus and a main power supply mode for supplying main power to the video display apparatus.

Figure 3:
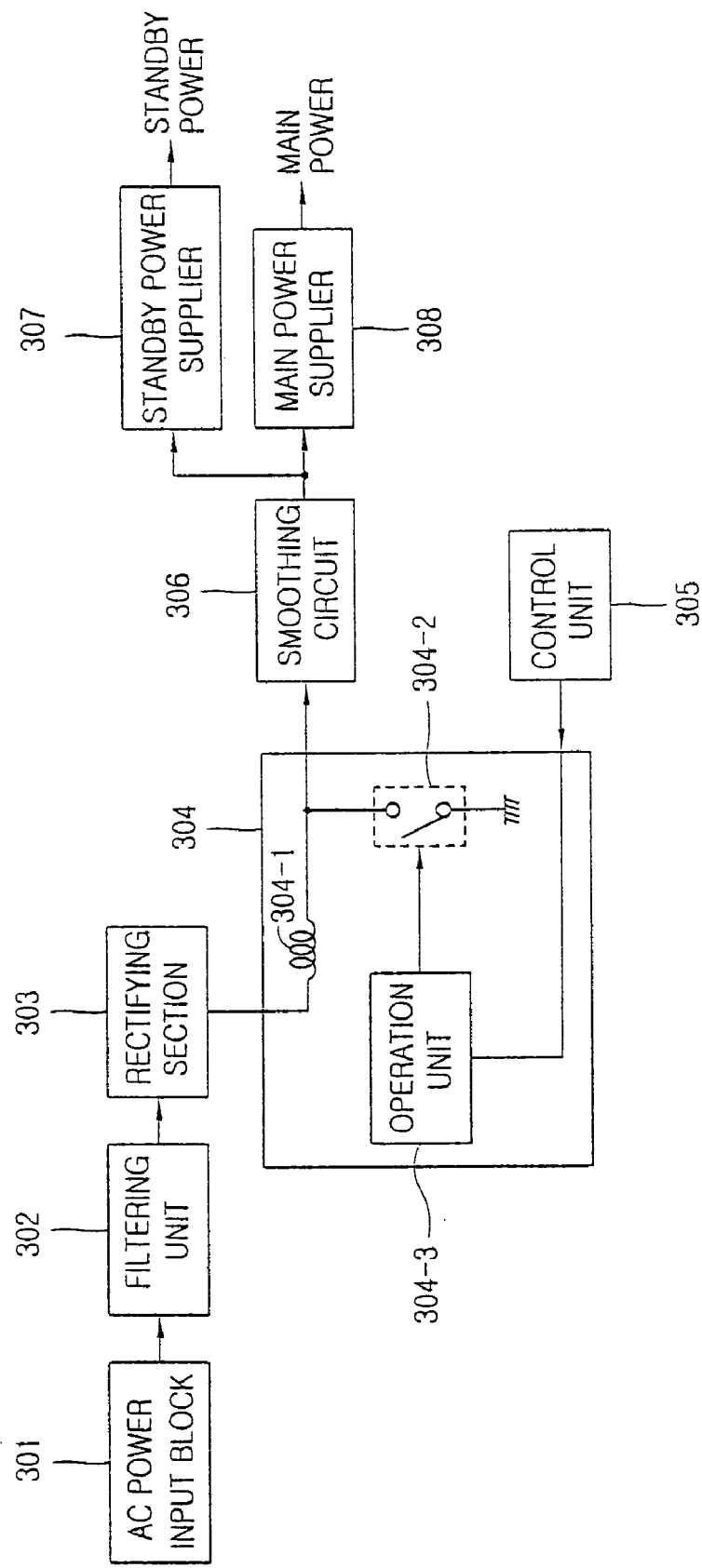
FIG. 3 is a circuit diagram showing a power supply device of a video display apparatus in accordance with a preferred embodiment of the present invention.

FIG. 3 is a circuit diagram showing a preferred embodiment of power supply device of a video display apparatus in accordance with the present invention. As shown in FIG. 3, the power supply device of the video display apparatus in accordance with a preferred embodiment of the present invention can include an AC power input block 301, a filtering unit 302 for removing EMI (electromagnetic interference) by filtering the AC power received through the AC power input block 301 and a rectifying section 303 for converting the AC power filtered in the filtering unit 302 into DC power. A harmonics suppressor (or a power factor correction circuit) 304 is for cutting off or reducing higher harmonics included in the DC power converted by the rectifying section 303. A control unit (e.g., a microcomputer) 305 is preferably for controlling the harmonics suppressor 304 according to a standby power supply mode or a main power supply mode. A smoothing circuit 306 can smooth the higher harmonics-cut off DC power, a standby power supplier 307 can supply the DC power smoothed by the smoothing circuit 306 to the video display apparatus as standby power and a main power supplier 308 can supply the DC power smoothed by the smoothing circuit 306 to the video display apparatus as main power.

The harmonics suppressor 304 can include a coil unit 304-1 preferably serial-coupled between the rectifying section 303 and the smoothing circuit 306 to cut off or reduce the higher harmonics included in the DC power converted by the rectifying section 303 and apply the higher harmonics-cut off DC power to the smoothing circuit 306. A switching unit 304-2 can supply the DC power to the smoothing circuit 306 by grounding the coil unit 304-1 or through the coil unit 304-1, and a switching operation unit 304-3 can control (e.g., switch) the switching unit 304-2 according to a control signal of the control unit 305. The coil unit 304-1 and the switching operation unit 304-3 can form a harmonic suppression circuit.

Figure 1:
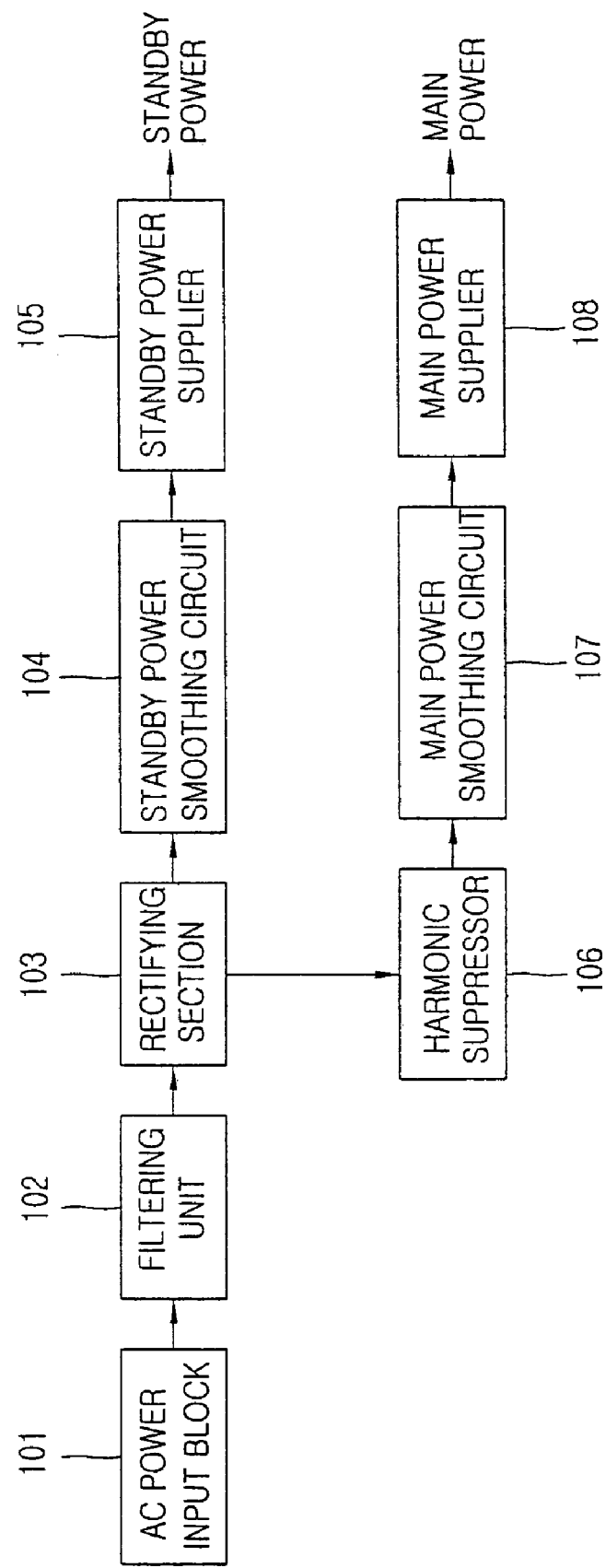
FIG. 1 is a block diagram illustrating a power supply device of a video display apparatus in accordance with the related art.
Figure 2:
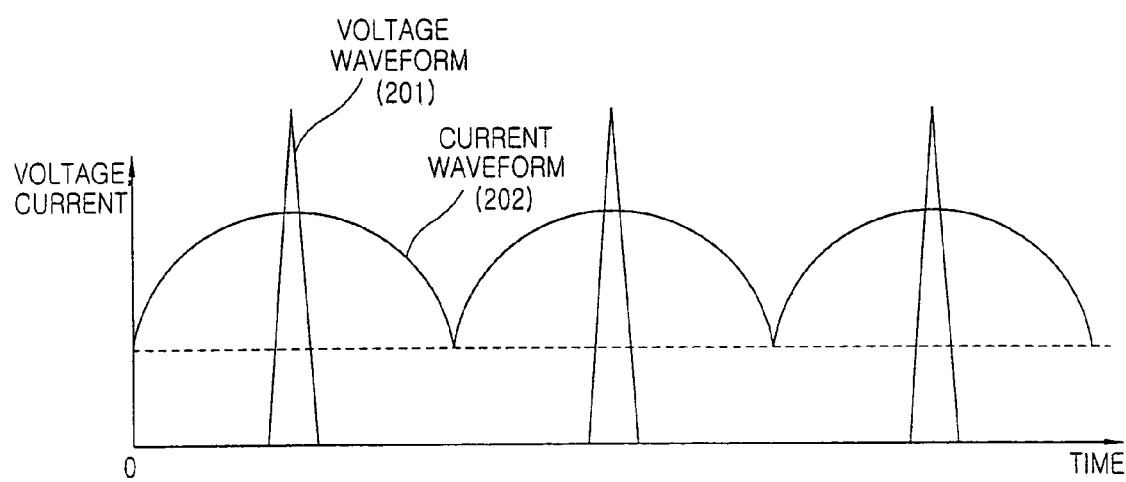
FIG. 2 is a graph showing ripple waveforms of a voltage and current inputted to a standby power supplier installed at the power supply device of the video display apparatus in accordance with the related art.
Figure 4:
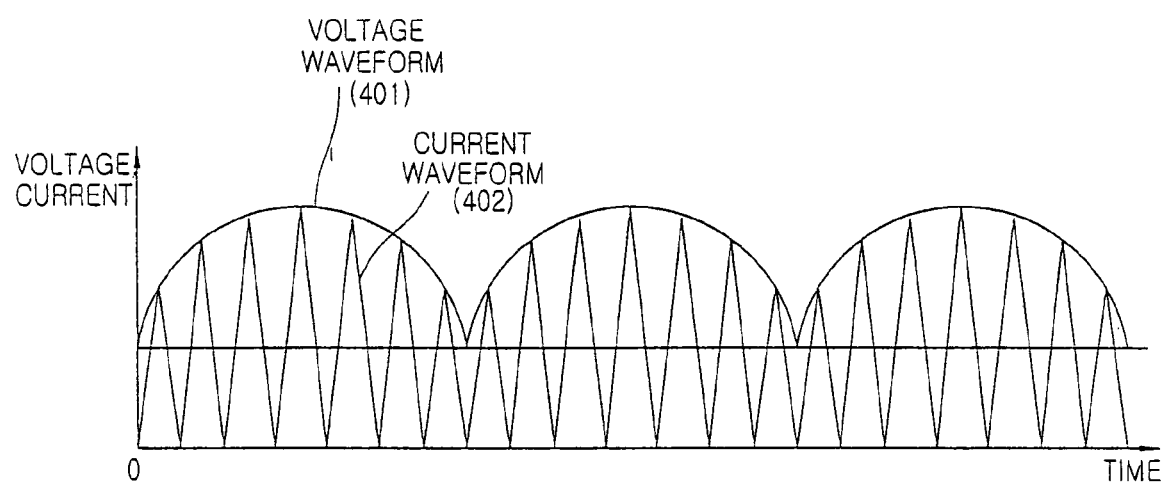
FIG. 4 is a graph showing ripple waveforms of a voltage and current outputted through a harmonics suppressor in accordance with a preferred embodiment of the present invention.

FIG. 4 is a graph showing ripple waveforms (e.g., voltage waveform 401, current waveform 402) of a voltage and current outputted from the harmonics suppressor 304. As shown in FIG. 4, the higher harmonics generated due to a rush current are removed or reduced by cutting off the rush current (e.g., 202 in FIG. 2) preferably by switching the current signal (e.g., current waveform 402) within an envelope level of the voltage waveform 401 of the DC power outputted from the rectifying section 303.

For example, the coil unit 304-1 of the harmonics suppressor 304 can cut off the inflow of the rush current, and the rush current cut-off current waveform 402 having a gentle curve such as a sine wave flows into the smoothing circuit 306. The rush current 202 inputted to the coil unit 304-1 of the harmonics suppressor 304 is inputted to the coil unit 304-1 only when a smoothing capacitor (not shown) of the rectifying section 303 is charged. Herein, the coil unit 304-1 has characteristics interfering the inflow of the rush current (e.g., 202 in FIG. 2).

To cut off the higher harmonics flowing into a standby power supplier, a higher harmonics cut-off circuit could be installed on a power supply channel connected between a standby power smoothing circuit and the standby power supplier. However, when the higher harmonics cut-off circuit is also installed at the standby power supplier, because additional construction of the power supply device of the video display apparatus is needed, it has a bad influence upon weight in the video display apparatus. In addition, because fabrication process is increased, operation efficiency and productivity of the video display apparatus may be lowered.

Operations of the power supply device of the video display apparatus in accordance with the preferred embodiment of FIG. 3 will now be described. First, the filtering unit 302 cuts off EMI preferably by removing noise element, etc. included in the AC power applied from the AC input block 301 and outputs the noise-removed AC power to the rectifying section 303. In more detail, the filtering unit 302 removes the noise element included in the AC power applied from the AC input block 301 and cuts off EMI by filtering the AC power applied from the AC input block 301 and outputting the filtered AC power to the rectifying section 303.

The rectifying section 303 converts the filtered AC power into DC power and supplies the converted DC power to the harmonics suppressor 304. A certain ripple element is included in the DC power converted by the rectifying section 303.

The harmonics suppressor 304 preferably cuts off or reduces the higher harmonics generated because of the rush current by cutting off the rush current included in the DC power converted by the rectifying section 303 and supplies the higher harmonics-cut off DC power to the smoothing circuit 306. Herein, the control unit 305 can control operations of the harmonics suppressor 304 according to a mode (e.g., a standby power supply mode or a main power supply mode) of the video display apparatus.

The standby power supply mode is supplying low power to the video display apparatus by receiving a request signal of a user through a remote controller (not shown) or power on/off switching (not shown) operation of the video display apparatus or the like in order to operate the video display apparatus.

The main power supply mode is supplying high power to the video display apparatus by receiving a request signal of a user through a remote controller (not shown) or power on/off switching (not shown) operation of the video display apparatus in order to operate the video display apparatus.

Operations of the control unit 305 and the harmonics suppressor 304 in the standby power supply mode will now be described. First, when a mode of the video display apparatus is switched into the standby power supply mode by a request of the user or the like, the control unit 305 outputs a control signal for stopping the operation of the operation unit 304-3 to the operation unit 304-3. The operation unit 304-3 turns off the switching unit 304-2 according to the control signal of the control unit 305 in the standby power supply mode. When the operation of the switching unit 304-2 is turned off, the DC power rectified in the rectifying section 303 is supplied to the smoothing circuit 306 through the coil unit 304-1 of the harmonics suppressor 304. In more detail, in the standby power supply mode, because the rush current included in the DC power (e.g., low power) supplied to the smoothing circuit 306 is lower than the rush current included in the DC power (e.g., high power) supplied to the smoothing circuit 306 in the main power supply mode, it is supplied to the smoothing circuit 306 only through the coil unit 304-1 of the harmonics suppressor 304. Thus, the higher harmonics included in the DC power (e.g., low power) can be cut off through the coil unit 304-1.

Operations of the control unit 305 and the harmonics suppressor 304 in the main power supply mode will now be described. When the video display apparatus is in the main power supply mode, the control unit 305 outputs a control signal for operating the operation unit 304-3 to the operation unit 304-3. In the main power supply mode, the operation unit 304-3 outputs a driving signal for switching the switching unit 304-2 to the switching unit 304-2 according to the control signal of the control unit 305. The switching unit 304-2 performs the on/off operation on the basis of the driving signal. Accordingly, as shown in FIG. 4, the rush current included in the DC power converted by the rectifying section 303 is cut off by grounding the coil unit 304-1 when the switching unit 304-2 is turned on. As shown in FIG. 3, the switching unit 304-2 is connected after the coil unit 304-1. However, the switching unit 304-2 can be connected before the coil unit 304-1. On the other hand, a normal current not including the rush current is outputted to the smoothing circuit 306 through the coil unit 304-1 when the switching unit 304-2 is turned off, and accordingly only the higher harmonics-removed DC power is supplied to the smoothing circuit 306.

For example, in the main power supply mode, the switching operation unit 304-3 switches the current signal with a timing as the current waveform 402 shown in FIG. 4 according to the control signal of the control unit 305. By switching the control signal within the envelope level (e.g., sine wave or the like) of the voltage signal 401, the higher harmonics can be cut off by restraining the rush current generation, and accordingly the higher harmonics-cut off DC power is supplied to the smoothing circuit 306. In more detail, in the main power supply mode, because the DC power supplied to the smoothing circuit 306 is high power, the rush current included in the DC power rectified in the rectifying section 303 is cut off by grounding the coil unit 304-1 of the harmonics suppressor 304, and the current not including the rush current is supplied to the smoothing circuit 306 through the coil unit 304-1 of the harmonics suppressor 304. Herein, the higher harmonics included in the DC power (e.g., high power) is cut off by grounding the coil unit 304-1. In addition, the higher harmonics cut-off DC power includes a certain ripple element.

Afterward, the smoothing circuit 306 smoothes the higher harmonics-removed DC power and respectively supplies the smoothed DC current to the standby power supply unit 307 and the main power supply unit 308. The standby power supplier 307 supplies the higher harmonics-removed stable DC power to the video display apparatus (not shown) as standby power. The main power supplier 308 supplies the higher harmonics-removed stable DC power to the video display apparatus as main power. Accordingly, in preferred embodiment of a power supply device and method of the video display apparatus in accordance with the present invention, by cutting off higher harmonics generated because of the rush current inflow, standby power and main power based on the higher harmonics-removed stable DC power can be supplied to the video display apparatus.

As described above, preferred embodiments according to the present invention have various advantages. In a power supply device of a video display apparatus in accordance with preferred embodiments of the present invention, it is possible to reduce or cut off higher harmonics applied to the standby power supplier and the main power supplier in the standby power supply mode and the main power supply mode. By cutting off higher harmonics included in the DC power, supplying the higher harmonics-removed DC power to the main power supplier or the standby power supplier through the smoothing circuit and controlling the harmonics suppressor selectively according to the standby power supply mode or the main power supply mode, it is possible to cut off or reduce the higher harmonics transmitted or transitioned to the main power line or the main power supplier in the standby power supply mode, prevent or reduce erratic operation of other apparatus or the video display apparatus and improve operational reliability of the video display apparatus.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power supply device of a video display apparatus, comprising:
   a rectifier configured to rectify input power;
   a harmonics suppressor coupled to the rectifier;
   a smoothing circuit coupled to the harmonics suppressor and configured to smooth power output by the harmonics suppressor;
   a power supplier connected to the smoothing circuit and configured to supply the smoothed power to the video display apparatus; and
   a controller configured to control an operation of the harmonics suppressor,
   wherein the power supplier comprises:
   a standby power supplier to supply the smoothed power to the video display apparatus as standby power: and
   a main power supplier to supply the smoothed power to the video display apparatus as main power.

2. The apparatus of claim 1, wherein the harmonics suppressor comprises:
   a harmonic suppression circuit to reduce the higher harmonics included in the power converted by the rectifier and apply the higher harmonics reduced power to the smoothing circuit; and
   a switch coupled between the harmonic suppression circuit and the smoothing circuit.

3. The apparatus of claim 2, wherein the controller operates the harmonic suppression circuit in the harmonics suppressor in the main power supply mode and bypasses the harmonic suppression circuit in the standby power supply mode.

4. The apparatus of claim 2, wherein the harmonic suppression circuit comprises:
   a switch configured to vary an amount of the converted power received by the smoothing circuit by selectively applying a reference voltage to the converted power; and
   a switch controller to operate the switch.

5. The apparatus of claim 4, wherein the reference voltage is a ground voltage.

6. The apparatus of claim 2, wherein the harmonic suppression circuit is a power factor correction circuit.

7. The apparatus of claim 2, wherein the harmonics suppressor comprises a coil to reduce the higher harmonics included in the power converted by the rectifier and apply the higher harmonics reduced power to the smoothing circuit, wherein the coil is connected in series with the switch.

8. A power supply device of a video display apparatus, comprising:
   a rectifier configured to rectify input power;
   a harmonics suppressor configured to shut off higher harmonics of the rectified power;
   a smoothing circuit configured to smooth the power output by the harmonics suppressor;
   a power supplier configured to supply the smoothed power to the video display apparatus as a first power in a first power supply mode or a second power in a second power supply mode; and
   a controller configured to control the harmonics suppressor to operate both in the first power supply mode to supply the first power or the second power supply mode to supply the second power.

9. The apparatus of claim 8, wherein the power supplier is a first power supplier to supply the smoothed power to the video display apparatus as the first power.

10. The apparatus of claim 8, wherein the power supplier is a second power supplier to supply the smoothed power to the video display apparatus as the second power.

11. The apparatus of claim 8, wherein the power supplier comprises:
    a first power supplier to supply the smoothed power to the video display apparatus as the first power; and
    a second power supplier to supply the smoothed power to the video display apparatus as the second power.

12. The apparatus of claim 11, wherein the controller is configured to control the harmonics suppressor in accordance with the first power supply mode and the second power supply mode.

13. The apparatus of claim 11, wherein the controller is configured to bypass rectified power to the first power supplier by turning off a harmonic suppression circuit in the harmonics suppressor in the first power mode, and wherein the controller is configured to supply the higher harmonics removed rectified power by turning on the harmonic suppression circuit in the second power supply mode.

14. The apparatus of claim 8, wherein the harmonics suppressor comprises:

a harmonic suppression circuit to reduce the higher harmonics included in the power converted by the rectifier and apply the higher harmonics reduced power to the smoothing circuit; and a switch coupled between the harmonic suppression circuit and the smoothing circuit.

15. The apparatus of claim 14, wherein the harmonic suppression circuit comprises:

a switch configured to vary an amount of the rectified power received by the smoothing circuit by selectively applying a reference voltage to the rectified power; and a switch controller to operate the switch.

16. The apparatus of claim 14, wherein the harmonic suppression circuit is a power factor correction circuit.

17. The apparatus of claim 16, wherein the harmonic suppression circuit comprises a coil to reduce the higher harmonics included in the power converted by the rectifier and apply the higher harmonics reduced power to the smoothing circuit, wherein the coil is connected in series with the switch.

18. The apparatus of claim 8, wherein the harmonics suppressor comprises:

a coil to remove the higher harmonics included in the power converted by the rectifier and apply the higher harmonics removed power to the smoothing circuit;

a switch to apply the rectified power to the smoothing circuit through the coil by being turned off in the first power supply mode to supply the first power to the video display apparatus and to apply the rectified power converted by the rectifier to the smoothing circuit by being selectively turned on and off to correspondingly connect and disconnect the coil to a reference voltage in the second power supply mode to supply the second power to the video display apparatus; and an operator to control an operation of the switch based on a control signal of the controller.

19. The apparatus of claim 8, wherein the first power is the standby power and the second power is the main power.

20. A power supply device of a video display apparatus, comprising:

a rectifier configured to rectify input power;

a smoothing circuit configured to smooth the power output by the rectifier;

a standby power supplier to supply the smoothed power to the video display apparatus as standby power;

a main power supplier to supply the smoothed power to the video display apparatus as main power; and a controller configured to control both in a standby power supply mode to supply the standby power or a main power supply mode to supply the main power.

21. The apparatus of claim 20, comprising:

a harmonics suppressor coupled between the rectifier and the smoothing circuit, wherein the harmonics suppressor comprises, a harmonic suppression circuit to reduce the higher harmonics included in the power converted by the rectifier and apply the higher harmonics reduced power to the smoothing circuit, and a switch coupled between the harmonic suppression circuit and the smoothing circuit.

22. The apparatus of claim 21, wherein the harmonic suppression circuit is a power factor correction circuit.

23. The apparatus of claim 22, wherein the harmonic suppression circuit comprises a coil to reduce the higher harmonics included in the power converted by the rectifier and apply the higher harmonics reduced power to the smoothing circuit, wherein the coil is connected in series with the switch.

24. A power supply method of a video display apparatus, comprising:

rectifying input power;

removing higher harmonics included in the rectified power in each of a first power supply mode for supplying power to a video display apparatus and a second power supply mode for supplying power to the video display apparatus;

smoothing the higher harmonics removed rectified power;

controlling supply of the smoothed higher harmonics rectified power to the video display apparatus as first power or second power, wherein the controlling bypasses rectified power to a first power supplier by turning off a harmonics suppressor in a first power mode, and wherein the controlling supplies the smoothed and removed higher harmonics by turning on the harmonics suppressor in a second power supply mode.

25. The method of claim 24, wherein the first power is a main power and the second power is a standby power.

* * * * *